United States Patent [19]

Fujii et al.

[11] Patent Number: 4,838,945

[45] Date of Patent: Jun. 13, 1989

[54] THERMOPLASTIC RESIN COMPOSITION FOR CLEANING

[75] Inventors: Hiroyuki Fujii, Ichihara; Takamichi Kudo, Higashikurume; Haruhiko Furukawa; Nobusuke Yamamoto, both of Ichihara, all of Japan

[73] Assignee: Chisso Corporation, Osaka, Japan

[21] Appl. No.: 16,864

[22] Filed: Feb. 20, 1987

[30] Foreign Application Priority Data

Feb. 20, 1986 [JP] Japan .................................. 61-35859
Sep. 8, 1986 [JP] Japan ................................ 61-210855

[51] Int. Cl.⁴ .......................... B08B 7/00; B08B 9/02; C11D 1/22; C11D 3/37
[52] U.S. Cl. ............................................. 134/7; 434/8; 434/22.14; 434/22.19; 434/23; 134/38; 252/174; 252/174.15; 252/174.23; 252/174.25; 252/554; 252/558; 252/DIG. 2; 252/DIG. 3
[58] Field of Search ...................... 252/174.23, DIG. 2, 252/554, 558, 174.15, DIG. 3, 174.25, 174; 134/7, 8, 38, 22.14, 22.19, 23

[56] References Cited

U.S. PATENT DOCUMENTS

| | | | |
|---|---|---|---|
| 2,346,228 | 4/1944 | Merrill | 18/48 |
| 2,779,696 | 1/1957 | Rutherford | 134/7 |
| 3,071,498 | 1/1963 | Kaskel | 134/7 |
| 3,119,720 | 1/1964 | Stiles | 134/22 |
| 3,798,064 | 3/1974 | Amoser | 134/7 |

FOREIGN PATENT DOCUMENTS

| | | | |
|---|---|---|---|
| 0150159 | 8/1981 | Fed. Rep. of Germany | 134/8 |
| 0108104 | 3/1971 | Japan | 252/174.23 |
| 0021751 | 3/1973 | Japan | 134/38 |
| 0059105 | 8/1973 | Japan | 252/174.23 |
| 0041004 | 4/1976 | Japan | 252/174.23 |
| 0124999 | 7/1984 | Japan | 252/174.23 |
| 0126440 | 7/1984 | Japan | 252/174.23 |
| 2019422A | 10/1979 | United Kingdom | |

*Primary Examiner*—Dennis Albrecht
*Assistant Examiner*—K. Markowski
*Attorney, Agent, or Firm*—Fred Philpitt

[57] ABSTRACT

A thermoplastic resin composition for cleaning a shaping apparatus such as an extrude by a simple operation, comprising 2-30% by weight of a sodium salt of sulfonic acid, 0.5-10% by weight of a water-repellent compound and a thermoplastic resin and as an optional component, finely ground inorganic compound having a particle size of 0.005 to 10 μm.

10 Claims, No Drawings

THERMOPLASTIC RESIN COMPOSITION FOR CLEANING

BACKGROUND OF THE INVENTION

1. Field of the Invention

This invention relates to a thermoplastic resin composition useful in cleaning an apparatus for shaping and fabricating thermoplastic resins.

2. Prior Arts

In the shaping of plastics, several kinds of treatment have been employed in order to get rid of the influence of preceding resin mixture remaining in the inside of shaping apparatus. Particularly, in the processing of colored products it is the actual state that troublesome workings such as cleaning of the inside of shaping apparatus, taking the apparatus apart for cleaning and accompanying suspension of a normal operation are inevitable at the time of change of color from preceding grade of relatively deep colored product such as blue or black colored to light colored product. In case of color change at the time of pelletizing, shaping by way of extrusion is taken as an example, such workings as suspension of an extruder operation, drawing out of a screw from a cylinder, cleaning of the screw and the inside of a cylinder by brushing or the like and reassembling the screw or the like are necessary. In the procedure in which a preceding kind of product is to be replaced by using some substitution resin, without drawing out of the screw, a large amount of resin is necessary for cleaning. Further, there is a problem of coloring inevitable in the following kinds of products because of the stain difficult to remove in the complicated construction parts within the extruder. In order to overcome these problems, compounds for clearing has been used. This means to make it easy to remove remaining material and complete the change of grade by using a small amount of substitution resin. Among compounds for cleaning, there is one in which a lubricant such as stearic acid or the like, is incorporated and there is also another in which acrylic resin having a higher melting temperature, etc. is used, but the former is attended with a drawback because cleaning effect is insufficient and the latter is attended with a drawback of stinking smell. Furthermore, there is another drawback that the reuse of substitution resin becomes difficult if these are mixed with the substitution resin. Further complex of operation is still unsettled e.g., compound must be used after dismantling a die, a breaker plate, a metal screen or the like because the viscosity of the melt of the latter is high. In addition, such a cleaning compound as those containing glass-fiber or the like is attended with drawbacks, e.g. substitution resin cannot be used again, and a screw or cylinder of shaping apparatus is liable to be worn out.

Further, it is possible to use in the cleaning of shaping and fabricating apparatus, a material obtained by blending powder of sodium alkylbenzenesulfonate with a substitution resin. However since sodium alkylbenzenesulfonate is so hygroscopic that a compound blended therewith is liable to become wet. On this account, there is a difficulty of handling such as bridge forming in the hopper of a shaping apparatus, a reduction of cleaning effect brought about by the absorbed moisture. Further in case of the fabrication of a thermoplastic resin composition to be carried out after those containing a large amount of a material such as calcium carbonate, magnesium silicate, barium sulfate, mica, etc. which is called as an inorganic filler or an inorganic pigment such as titanium oxide, ultramarine blue, red ocher or the like as a raw material, it is necessary to remove sufficiently the preceding kinds of resin mixture remaining in the shaping apparatus.

As evident from the foregoing description, an object of the present invention is to provide a cleaning thermoplastic resin composition, which makes it possible to get rid of the resin of precedent kinds of product remaining in the inside of shaping apparatus by simultaneously using a small amount of substitution resin through a simple and convenient operation.

As the result of study for cleaning-method, for shaping and fabricating apparatus in various way, we, the inventors of this application, have found that a resin composition obtained by adding a water repellent material such as liquid paraffin or a finely ground inorganic compound such as white carbon or the like to a neutral salt of an organic sulfonic acid such as sodium alkylbenzenesulfonate and mixing the resulting mixture with a thermoplastic resin, followed by pelletizing, have a superior cleaning effectiveness and completed the present invention.

SUMMARY OF THE INVENTION

In the first aspect, the present invention resides in a thermoplastic resin composition comprising (I) 2–30% by weight of at least one sodium salt of sulfonic acid selected from the group consisting of
  (a) sodium alkylbenzenesulfonate having from 6 to 20 carbon atoms in alkyl group,
  (b) sodium alkylsulfonate having from 8 to 20 carbon atoms in alkyl group, and
  (c) sodium salt of dialkylester of sulfosuccinic acid and an alcohol having 6–16 carbon atoms;
(II) 0.5–10% by weight of at least one water-repellent compound selected from the group consisting of a metal salt of higher fatty acid, a composite metal soap of the foregoing members, wax, liquid paraffin, synthetic wax and silicone; and
(III) 60–97% by weight of a thermoplastic resin.

In the second aspect, the present invention resides in a thermoplastic resin composition comprising the above-mentioned compositions (I), (II) and (III), and as fourth component (IV) 0.05–5% by weight of finely ground powder of at least one inorganic compound selected from the group consisting of silicon dioxide, white carbon, diatomaceous earth, calcium silicate, aluminum silicate, bentonite, zeolite, basic magnesium carbonate, natural gypsum, pumice, and volcanic ash and having a particle size from 0.005–10 $\mu$m.

DETAILED DESCRIPTION OF THE INVENTION

Thermoplastic resins useful in the composition of the present invention include: polyolefins such as polyethylene, polypropylene, polybutene, polymethylpentene, polyvinyl chloride, polyvinylidene chloride, polyvinyl acetate, polystyrene, polyacrylonitrile, a copolymer resin of foregoing member, ABS resin, MBS resin, polyester resin, polyamide resin, alone or in the form of mixture of two or more of the foregoing members.

As water repellent compound, a fatty acid having from 10 to 18 carbon atoms, sodium salt, potassium salt, lithium salt, calcium salt of these acids, zinc compound or a composite metal soap of these compounds, wax, liquid paraffin, a synthetic wax such as polyethylene wax, or the like, silicone, etc. can be used singly or in the form of a mixture.

In the composition, it is preferable that the content of a salt of sulfonic acid is in the range of 2–30% by weight and preferably in the range of 4–20% by weight. A composition having a content of a salt of sulfonic acid less than 2% by weight has only a small cleaning effect and a composition having a content of a salt of sulfonic acid greater than 30% by weight is not suitable because it shows too much foaming at the step of its preparation and pelletizing, and pelletizing and shaping is extremely difficult.

It is preferable that the content of a water repellent compound is in the range of 0.5–10% by weight. A water-repellent compound performs a function of a lubricant in the inside of an extruder at the time of producing a thermoplastic resin composition but pelletizing becomes infeasible with a content less than 0.5% because lubricating effect is small and foaming becomes violent. Further use of a water-repellent compound in an amount greater than 10% is not adequate because extrusion of sufficiently blended compound becomes difficult at the time of pelletizing because of too strong lubicating property.

As for one more component i.e. an inorganic compound having a particle size of 0.005–10 $\mu$m, a single material or a mixture of two kinds or more of silicon dioxide, diatomaceous earth, white carbon, calcium silicate, aluminum silicate, bentonite, zeolite, basic magnesium carbonate, natural gypsum, pumice, volcanic ash, etc. are used. Among these inorganic powdery compounds, silicon dioxide, diatomaceous earth, white carbon is particularly and preferably used.

If the particle diameter is less than 0.005 $\mu$m, inorganic powdery materials tend to be scattered at the time of preparation and mixing of the compound and hence it has a drawback of difficulty of handling. A composition in which inorganic powdery material having a particle diameter greater than 10 $\mu$m is not preferable because cleaning effect for a shaping machine is inferior. Among these inorganic powdery material those having a specific gravity of 1–3 are used i.e. those having a specific gravity, not smaller than the specific gravity of component thermoplastic resin and a substitution resin are preferable.

The content of an inorganic powdery material among the compositions of the present invention, is in the range of 0.05–5% by weight, preferably 0.1–3% by weight. If the content of the inorganic powdery material is less than 0.05% by weight, cleaning effect is smaller. If the content is greater than 5% by weight, substitution resin used for cleaning must be increased. Accordingly, both the cases are not preferable.

The mechanism of function of inorganic compound powder for the cleaning of shaping apparatus carried out by using a thermoplastic resin composition is not clear, but it is supposed that the inorganic powder rubs pigments and fillers, particularly inorganic pigments and inorganic fillers having been included in the precedent kind of product and remaining in the inside of shaping apparatus thereby to detach the latter and carry out into the stream of resin.

The thermoplastic resin composition of the present invention can contain a heat stabilizer, a lubricant, a plasticizer, etc., if necessary besides the above-mentioned component.

The preparation of the thermoplastic resin composition of the present invention can be conducted according to a process for preparing an ordinary thermoplastic resin composition. For example, a preliminary mixed composition is charged to a hopper of an extruder and caused to extrude melted composition through a heated extruder and particles of composition are obtained by cutting strands.

For mixing, a common mixer such as a high speed mixer of Henschel type, a ribbon mixer, a tumbler, a gate mixer can be used, depending upon kinds and shape of resin.

As for the shape of a thermoplastic resin used, material having a powdery form, bead form, flake form, or pellet form can be used. A neutral salt of sulfonic acid, and a water-repellent compound can be used in the powdery form, paste form or liquid form.

An inorganic compound can be used as a powder per-se or in the form of a master batch in which an inorganic compound is admixed and dispersed in advance in a part or a whole amount of a thermoplastic resin.

There is no limitation for an extruder, any of single screw extruder, a twin screw extruder, co-kneader can be used.

Cutting of strands for the purpose of pelletizing can be done either under water or in the air.

By using a thermoplastic resin composition provided by the present invention, an extremely effective process can be realized for cleaning a shaping apparatus at the time of change of grade in the shaping of plastics. Namely, by using a small amount of a resin composition of the present invention, the amount of consumption of substitution resin can be remarkably reduced as compared with the case where substitution is conducted only by the resin which is charged to clean a shaping apparatus. If an example is taken from cases where cleaning of a shaping apparatus of extruder and if the composition of the present invention is used together with substitution resin, the required amount of substitution resin can be reduced to less than 1/10 of the amount consumed at the time of cleaning of an apparatus for the purpose of color change without using the composition of the present invention. Further, the time required for color change can be reduced also to less than 1/5.

The composition of the present invention has a water-repellent property and hardly loses its cleaning effect even after 3 month storage. It is an excellent cleaning composition which can endure storage for a long period of time.

When it is used for cleaning an extruder having contamination which gives out special bad smell such as in case of a thermoplastic resin containing maleic anhydride, the amount of extrusion having a strong bad smell can be greatly reduced, and a time necessary for change of grade can be greatly reduced. Accordingly, it brings about indirect spreading effectiveness of improvement of working environment.

Further a substitution resin which has been used once can be used as a part of cleaning resin. Accordingly, reuse of substitution resin can be also expected.

The present invention will be described more fully by way of following specific examples which are not presented to limit the scope of the invention.

In the specific examples as well as in Comparative examples, the cleaning effects were evaluated by the amount of substitution resin consumed and the time required from feeding of a cleaning thermoplastic resin to vanishment of color of discharged substitution resin, in the cleaning test carried out according to the following procedure.

Procedure of cleaning test

Contamination was carried out by using a thermoplastic resin composition containing, as a coloring agent, 2% by weight of phthalocyanine blue. To a single screw extruder having L/D of 30, and cylinder diameter of 35 mm, 250 g of a cleaning thermoplastic resin was charged and revolution of screw was started. At the time when a thermoplastic resin began to be discharged out, revolution of the screw was stopped for a short period of time (1-5 minutes). Then the revolution of screw was started again by charging the thermoplastic resin the same as the one used in the cleaning resin composition and measurement is made as to the amount of substitution resin consumed and time required till the color of strand extruded becomes colorless.

In other examples, maleic anhydride was used as a contamination source in place of phthalocyanine blue and evaluation was made by the amount of substitution resin consumed and required time until the vanishment of a special bad smell.

Further in specific examples 9-16 and in Comparative examples 4-6, as thermoplastic resin composition used to contaminate an extruder, calcium carbonate or barium sulfate was used as a filler to be admixed in an amount of 20% by weight and ultramarine blue was used as a coloring agent in place of phthalocyanine blue. In each of the specific examples and Comparative examples, % means % by weight.

EXAMPLE 1

4.5 Kg of homopolymer polypropylene resin having a melt flow rate (abbreviated to MFR) of 5 g/10 min., according to JIS K 6758 wherein the temperature and force employed are 230° C. and 2.16 Kg f, respectively and being designated by a tradename Chisso Polypro K 1016, 0.45 Kg of sodium decylbenzenesulfonate, and 0.05 Kg of calcium stearate were blended in a high speed mixer having a 20 liter volume by agitating for 3 minutes under a revolution of 500 r.p.m. The obtained blend was fed to an extruder having L/D ratio of 20:1 and a cylinder diameter of 20 mm to obtain an extrudate under the condition of a screw revolution of 60 r.p.m., a cylinder temperature of 200° C. and a die temperature of 190° C. The extrudate strands were cut under water by a pelletizer to obtain a thermoplastic resin composition of milky-white granules. Four days after pelletizing, the obtained resin composition was submitted to a cleaning test employing a testing extruder which had previously been stained by extruding a colored polypropylene mixture containing phthalocyanine blue pigment (2%) and polypropylene of the same grade of the resin as that used in this example. 250 g of a cleaning resin composition was fed to the test extruder at a cylinder temperature of 220° C., followed by stopping the extruder screw revolution for 5 minutes at the time when a slightest portion of the cleaning resin was firstly extruded from a die, and by feeding a substitution resin and by restarting screw revolution. As a result 0.5 Kg of substitution resin was consumed and 11 minutes was required before the extrudate was satisfactorily replaced by the substitution resin.

EXAMPLE 2

The cleaning resin composition prepared as in Example 1 was kept indoors in a triple-layered paper bag for 90 days before being submitted to the same cleaning test as in Example 1. As a result 0.5 Kg of a substitution resin was consumed and 12 minutes was required before the extrudate was satisfactorily replaced by the substitution resin.

EXAMPLE 3

Example 2 was repeated by using 2.5% of maleic anhydride in place of 2% of phthalocyanine blue and by changing the cylinder temperature to 190° C. As a result 0.3 Kg of a substitution resin was consumed and 8 minutes were required before the extrudate with a pungent smell was satisfactorily replaced by a substitution resin.

EXAMPLE 4

Polyethylene resin (3.8 Kg) of which melt flow rate (MFR) according to the method defined in JIS K 6760 wherein the determination condition are 190° C. and 2.16 Kg f., was 5 g/10 min., (designated by tradename Chisso Polyethy M850), sodium tridecylbenzenesulfonate (0.9 Kg), zinc stearate (0.2 Kg), and polyethylene wax (0.1 Kg) of which a number average molecular weight was 1500, were blended in a similar manner to that in Example 1. The obtained resin blend was fed to an extruder under the condition of a cylinder temperature of 220° C., a die temperature of 210° C. and a revolution rate of an extruder screw of 60 rpm, to obtain milky-white pellets of a cleaning resin composition. After being kept for 5 days indoors, the obtained pellets (250 g) were fed to a test extruder which had been stained by extruding a polyethylene resin mixture containing phthalocyanine blue pigment (2%). The cleaning test were carried out under the condition of a cylinder temperature of 230° C. and a time of interruption of the screw revolution of 3 minutes. An amount of polyethylene substitution resin and the time required for replacing the colored extrudate by substitution resin were 0.3 Kg and 7 minutes, respectively.

EXAMPLE 5

4.7 Kg of polystyrene resin (designated by tradename Styron 666 supplied by Asahi Chemical Industry, Co.), 0.2 Kg of sodium tridecylbenzenesulfonate and 0.05 Kg of polyethylene wax (number average molecular weight being 1500) were blended in a similar manner to that in Example 1. The obtained blend were extruded under the condition of a cylinder temperature, a die temperature and a screw revolution rate, of 210° C., 200° C. and 60 rpm, respectively, to obtain transparent pellets. After being kept for 33 days indoors, the obtained granular polystyrene resin was fed to the extruder which had been stained by colored polystyrene resin containing phthalocyanine blue (2%). The cleaning test was conducted at the cylinder temperature of 200° C., and the time of interruption (i.e. suspension) of screw revolution of 5 minutes. As a result 18 minutes were required to replace the colored molten resin by substitution polystyrene resin, and the consumption of the substitution resin was 1.0 Kg.

EXAMPLE 6

4.2 Kg of acrilonitrile-butadiene-styrene copolymer (ABS) resin (designated by tradename Stylack 200 supplied by Asahi Chemical Industry, Co.), 0.6 Kg of sodium decylbenzenesulfonate, 0.1 Kg of liquid paraffin (equivalent to ISO VG 100 grade) and 0.1 Kg of stearic acid were blended and extruded in a similar manner to that in Example 1, to obtain milky-white pellets. The pellets were kept for 15 days indoors before they were used in the cleaning test employing an extruder stained by colored ABS resin containing phthalocyanine blue pigment (2%). The result of the cleaning test was shown in Table 1 together with those of Examples 1 to 5.

EXAMPLE 7

4.3 Kg of polyvinyl chloride resin (designated by tradename Nipolit SR supplied by Chisso Corp.), 0.4 Kg of sodium decylbenzenesulfonate, 0.15 Kg of calcium stearate, and 0.15 Kg of zinc stearate were blended and extruded in a similar manner to that in Example 1, applying a cylinder temperature of 180° C. and a die temperature of 170° C., to obtain light yellow pellets. After being kept for 20 days indoors, the obtained granules were subjected to a cleaning test employing the extruder stained by colored polyvinyl chloride resin containing phthalocyanine blue pigment (2%). The test condition and the results of the cleaning test are shown in Table 1.

EXAMPLE 8

A procedure of cleaning test in Example 2 was repeated to obtain pellets (560 g) which were the mixture of used cleaning resin and substitution resin. A blend of this pellets (150 g) and the cleaning resin pellets (100 g) prepared in Example 2 and stored for 90 days, was subjected to a cleaning test, applying a similar condition to that in Example 1. As a result, 0.6 Kg of substitution polypropylene resin was consumed and 13 minutes was necessary before replacing the colored extrudate by a substitution resin.

COMPARATIVE EXAMPLE 1

A cleaning test in Example 1 was repeated without using a cleaning polypropylene resin composition of the present invention. As a result, 13.0 Kg of substitution resin was consumed and 88 minutes were necessary before the extrudate was satisfactorily replaced by the substitution resin.

COMPARATIVE EXAMPLE 2

A blend of a cleaning resin prepared by using a high speed mixer in a similar manner to that in Example 1, was stored indoors in a triple-layered paper bag for 90 days without being further pelletized. The blend was submitted to a cleaning test in Example 1 by replacing the cleaning resin composition by this blend. As a result, 7.2 Kg of substitution resin was consumed and 48 minutes were necessary before the colored extrudate was replaced by the substitution resin.

COMPARATIVE EXAMPLE 3

A cleaning test in Example 3 was repeated without using the cleaning resin pellets. As a result 5.3 Kg of substitution resin was consumed and 30 minutes was necessary before vanishment of pungent smell in the molten extrudate. The results of Comparative examples were shown in Table 1 together with the results of Examples.

TABLE 1

|  | Example |  |  |  |  |  |  |  | Comparative example |  |  |
|---|---|---|---|---|---|---|---|---|---|---|---|
|  | 1 | 2 | 3 | 4 | 5 | 6 | 7 | 8 | 1 | 2 | 3 |
| Contaminant and[1] | PB | → | MA | PB | → | → | → | → | → | → | MA |
| base resin | PP | → | → | PE | PS | ABS | PVC | PP | → | → | → |
| Storage period of cleaning resin composition (days) | 4 | 90 | 90 | 5 | 33 | 15 | 20 | 90 | — | 90 | — |
| Cleaning test condition |  |  |  |  |  |  |  |  |  |  |  |
| Cylinder temperature (° C.) | 220 | → | 190 | 230 | 200 | 210 | 170 | 220 | 220 | → | 190 |
| Time of interruption of screw operation (min.) | 5 | → | → | 3 | 5 | 2 | 1 | 5 | — | 5 | — |
| Substitution resin[1] | PP | → | → | PE | PS | ABS | PVC | PP | PP | → | → |
| and its consumption (Kg) | 0.5 | 0.5 | 0.3 | 0.3 | 1.0 | 0.4 | 1.2 | 0.6 | 13.0 | 7.2 | 5.2 |
| Time required for color change (min.) | 11 | 12 | 8 | 7 | 18 | 7 | 17 | 13 | 88 | 48 | 30 |

[1] Abbreviation of contaminant compound and resin:
PB: phthalocyanine blue,
MA: maleic anhydride,
PP: polypropylene,
PE: polyethylene,
PS: polystyrene
[2] Arrow mark → means that description is the same with that in the left adjacent column.

EXAMPLE 9

4.4 Kg of polypropylene resin which was designated as in Example 1, 0.45 Kg of sodium decylbenenesulfonate, 0.05 Kg of silicon dioxide finely divided powder (particle size in diameter was less than 3.5 μm, designated by tradename Syloid 244 supplied by Fuji-Davison Chemical, Ltd.) and 0.1 Kg of calcium stearate were blended and extruded in a similar manner to that in Example 1, followed by pelletizing to give milky-white polypropylene resin composition. After being stored for 6 days since pelletization, the obtained granular cleaning polypropylene resin was subjected to a cleaning test employing a test extruder which had previously been used to extrude a colored polypropylene mixture containing ultramarine blue pigment (2%) and calcium carbonate (20%). 250 g of the cleaning resin pellets was fed to the test extruder at a cylinder temperature of 240° C., then the revolution of the extruder screw was interrupted for 5 minutes at the time when a first slightest portion of the cleaning resin began to be extruded from the die, followed by restarting the screw revolution, and feeding a substitution polypropylene resin. As a result, 0.6 Kg of substitution resin was consumed and 13 minutes were necessary before the colored extrudate was satisfactorily replaced by the substitution resin.

EXAMPLE 10

The cleaning resin composition prepared in Example 9, was stored indoors in a triple-layered paper bag for 90 days since preparation thereof. Then the cleaning resin composition was subjected to a cleaning test similar to that in Example 9. As a result, 0.6 Kg of substitution resin was consumed and 12 minutes was necessary before the extrudate was satisfactorily replaced by a substitution resin.

EXAMPLE 11

A cleaning test in Example 10 was repeated except that maleic anhydride (2.5%) was used in place of ultramarine blue pigment (2%) and the temperature of a cylinder was set at 200° C. As a result, 0.5 Kg of substitution resin was consumed and 11 minutes was necessary before a pungent smell in molten extrudate satisfactorily vanished.

EXAMPLE 12

3.8 Kg of polyethylene resin having the same designation as in Example 4, 0.8 Kg of sodium decylbenzenesulfonate, 0.1 Kg of silicon dioxide powder having the same designation as in Example 9, and 0.3 Kg of polyethylene wax of which number average molecular weight was 1500, were blended in a similar manner to that in Example 1. The obtained blend was fed to the pelletizing extruder where the screw was rotating at a rate of 60 rpm under a cylinder temperature of 220° C. and a die temperature of 200° C., followed by pelletizing to give a milky-white cleaning polyethylene resin composition. After being stored for 7 days since pelletization, the granular cleaning resin conposition (250 g) was fed to the test extruder where the cylinder temperature was 240° C., followed by interrupting screw revolution for 3 minutes, restarting the screw and feeding a substitution polyethylene resin. As a result, 0.4 Kg of substitution resin was consumed and 9 minutes were necessary before the colored extrudate was replaced by a substitution resin.

EXAMPLE 13

Polystyrene resin (4.5 Kg) having the same designation as that used in Example 5, sodium salt of di-n-octyl sulfosuccinate (0.3 Kg), white carbon (0.15 Kg) which consists mainly of hydrous silica having average particle size of 0.03 μm, and polyethylene wax (0.05 Kg) having a number average molecular weight of 1500, were blended in a similar manner to that in Example 1, followed by extruding the blend under the condition of a cylinder temperature of 210° C., a die temperature of 200° C. and a screw revolution rate of 60 rpm, and pelletizing the extrudate in a similar manner to that in Example 9 to obtain transparent pellets. The obtained pellet were stored indoors for 25 days followed by subjecting to a cleaning test using a extruder which had previously been stained by extruding a colored polystyrene resin containing calcium carbonate (20%) and ultramarine blue pigment (2%). The test was conducted under the condition of a cylinder temperature of 220° C. and a time of interrupting screw revolution of 3 minutes. As a result, 1.2 Kg of substitution resin was consumed and 19 minutes was required before replacing a colored extrudate by substitution resin.

EXAMPLE 14

ABS resin (4.3 Kg) having the same designation as used in Example 6, sodium alkylsufonate (0.5 Kg) having an average molecular weight of 320, diatomaceous earth (0.05 Kg) having an average particle size of 4.3 μm and being designated by tradename Radiolite F, liquid paraffin (0.05 Kg) of the same grade as used in Example 6, and stearic acid (0.1 Kg) were blended in a similar manner as in Example 1, followed by extruding the obtained blend in a similar manner to that in Example 1 to obtain milky-white pellets of a cleaning resin composition. After being stored indoors for 30 days, the obtained cleaning resin composition was subjected to a cleaning test using an extruder which had been stained by extruding an ABS resin mixture containing 20% calcium carbonate and 2% ultramaine blue pigment. A result is shown in Table 2 together with those of Examples 9 to 13.

EXAMPLE 15

Polyvinyl chloride resin (4.4 Kg) having the same designation as that used in Example 7, sodium decylbenzenesulfonate (0.35 Kg), finely divided silcion dioxide powder (0.02 Kg) having the same designation as that used in Example 9, calcium stearate (0.13 Kg) and zinc stearate (0.10 Kg) were blended and extruded in a similar manner to that in Example 9 under the condition of a cylinder temperature of 180° C. and a die temperature of 170° C., to obtain light-yellow pellets of a cleaning resin composition. The obtained resin composition was subjected to a cleaning test employing an extruder stained by previously extruding a PVC resin mixture containing 20% barium sulfate and 2% ultramarine blue pigment. A result was shown in Table 2.

EXAMPLE 16

A procedure of a cleaning test in Example 10 was repeated, followed by cutting extrudate strands to obtain pellets (640 g) which were the mixture of used cleaning resin and substitution resin. A blend of the obtained pellets (150 g) and a cleaning resin composition (100 g) used in Example 2 was subjected to a cleaning test of which the conditions were similar to those in Example 9. As a result, 0.8 Kg of a substitution polypropylene resin were consumed and 16 minutes was required before replacing a colored extrudate by a substitution resin.

COMPARATIVE EXAMPLE 4

A procedure of cleaning test in Example 9 was repeated without using a cleaning resin pellets. As a result, 16 Kg of substitution resin was consumed and 102 minutes was required before the colored extrudate was satisfactorily replaced by the substitution resin.

COMPARATIVE EXAMPLE 5

A blend of polypropylene resin prepared by using a high speed mixer in Example 9 was stored indoors in a triple-layered paper bag for 90 days without being pelletized. This blend was subjected to a cleaning test in place of a pelletized cleaning resin composition in Example 9 under the same test condition as that of Example 9. As a result, 7.8 Kg of substitution resin was consumed and 55 minutes was required before the colored extrudate was satisfactorily replaced by substitution resin.

COMPARATIVE EXAMPLE 6

A cleaning test procedure in Example 11 was repeated without using a cleaning resin composition. As a result, 6.0 Kg of substitution resin was consumed and 33 minutes was required before a pungment smell in a molten extrudate vanished satisfactorily.

COMPARATIVE EXAMPLE 7

Example 9 was repeated by using 0.45 Kg of monoglyceride of stearic acid in place of sodium decylbenzenesulfonate to obtain a pelletized cleaning resin composition. After being stored indoors for 8 days, the obtained resin composition was subjected to a cleaning test similar to that in Example 9. As a result, 5.0 Kg of substitution resin was consumed and 28 minutes was required before the colored extrudate was satisfactorily replaced by the substitution resin. These results of Comparative examples are shown in Table 2 with those of Examples 9 to 16.

TABLE 2

| | Example | | | | | | | | Comparative example | | | |
|---|---|---|---|---|---|---|---|---|---|---|---|---|
| | 9 | 10 | 11 | 12 | 13 | 14 | 15 | 16 | 4 | 5 | 6 | 7 |
| Contaminant[1] | CC + UB | → | CC + MA | CC + UB | → | → | BS + UB | CC + UB | → | → | CC + MA | CC + UB |
| and base resin | PP | → | → | PE | PS | ABS | PVC | PP | → | → | → | → |
| Storage period of cleaning resin composition (days) | 6 | 90 | → | 7 | 25 | 30 | → | 90 | — | 90 | — | 8 |
| Cleaning test condition | | | | | | | | | | | | |
| Cylinder temp. (°C.) | 240 | → | 200 | 240 | 220 | 230 | 180 | 240 | → | → | 200 | 240 |
| Time of interruption of screw operation (min.) | 5 | → | → | 3 | → | → | 1 | 5 | — | 5 | — | 5 |
| Substitution resin[1] and its | PP | → | → | PE | PS | ABS | PVC | PP | → | → | → | → |
| consumption (Kg) | 0.6 | 0.6 | 0.5 | 0.4 | 1.2 | 0.5 | 1.4 | 0.8 | 16.0 | 7.8 | 6.0 | 5.0 |
| Time required for color change (min.) | 13 | 12 | 11 | 9 | 19 | 10 | 18 | 16 | 102 | 55 | 33 | 28 |

[1]Abbreviations of contaminant compound and resin:
CC: calcium carbonate,
BS: barium sulfate,
MA: maleic anhydride,
UB: ultramarine blue,
PP: polypropylene,
PE: polyethylene,
PS: polystyrene,
ABS: acrilonitril-butadiene-styrene copolymer
[2]Arrow mark → means that the description is the same with that in the left adjacent column.

What is claimed is:

1. A thermoplastic resin composition for cleaning a shaping apparatus, comprising
   (1) 2-30% by weight of at least one sodium salt of sulfonic acid selected from the group consisting of sodium salt of alkylbenzenesulfonic acid having from 6 to 20 carbon atoms in alkyl group, sodium salt of alkylsulfonic acid having from 8 to 20 carbon atoms in alkyl group and sodium salt of diester of sulfosuccinic acid and alcohol having from 6 to 16 carbon atoms in alcohol residue,
   (2) 0.5-10% by weight of at least one water-repellent compound selected from the group consisting of metal salt of higher fatty acid, wax, liquid paraffin, synthetic wax and silicone, and
   (3) 60-97% by weight of a thermoplastic resin.

2. A thermoplastic resin composition for cleaning a shaping apparatus comprising
   (1) 2-30% by weight of at least one sodium salt of sulfonic acid selected from the group consisting of sodium salt of alkylbenzenesulfonic acid having from 6 to 20 carbon atoms in alkyl group, sodium salt of alkylsulfonic acid having from 8 to 20 carbon atoms in alkyl group and sodium salt of diester of sulfosuccinic acid and alcohol having from 6 to 16 carbon atoms in alcohol residue,
   (2) 0.5-10% by weight of at least one water-repellent compound selected from the group consisting of metal salt of higher fatty acid, wax, liquid paraffin, synthetic wax and silicone,
   (3) 0.05-5% by weight of at least one inorganic compound selected from the group consisting of silicon dioxide, white carbon, diatomaceous earth, calcium silicate, aluminum silicate, bentonite, zeolite, basic magnesium carbonate, natural gypsum, pumice and volcanic ash and having a particle size of from 0.005-10 μm, and
   (4) 60-97% by weight of a thermoplastic resin.

3. The composition according to claim 1 which is in pellet form.

4. The composition according to claim 2 which is in pellet form.

5. A composition according to claim 1 wherein (a) is a sodium salt of an alkylbenzene sulfonic acid.

6. A method for cleaning the interior of a shaping apparatus which contains residual amounts of a thermoplastic resin that has an undesirable color or odor which comprises introducing into the interior of said shaping apparatus and passing therethrough a cleaning composition that comprises
   (1) 2-30% by weight of at least one sodium salt of sulfonic acid selected from the group consisting of sodium salt of alkylbenzene sulfonic acid having from 6 to 20 carbon atoms in alkyl group, sodium salt of alkylsulfonic acid having from 8 to 20 carbon atoms in alkyl group and sodium salt of diester of sulfosuccinic acid and alcohol having from 6 to 16 carbon atoms in alcohol residue, (2) 0.5–10% by weight of at least one water-repellent compound selected from the group consisting of metal salt of higher fatty acid, wax, liquid paraffin, synthetic wax and silicone, and (3) 60–97% by weight of a thermoplastic resin.

7. A method for cleaning the interior of a shaping apparatus which contains residual amounts of a thermoplastic resin that has an undesirable color or odor which comprises introducing into the interior of said shaping apparatus and passing therethrough a cleaning composition that comprises (1) 2–30% by weight of at least one sodium salt of sulfonic acid selected from the group consisting of sodium salt of alkylbenzenesulfonic acid having from 6 to 20 carbon atoms in alkyl group, sodium salt of alkylsulfonic acid having from 8 to 20 carbon atoms in alkyl group and sodium salt of diester of sulfosuccinic acid and alcohol having from 6 to 16 carbon atoms in alcohol residue, (2) 0.5–10% by weight of at least one water-repellent compound selected from the group consisting of metal salt of higher fatty acid, wax, liquid paraffin, synthetic wax and silicone, (3) 0.05–5% by weight of at least one inorganic compound selected from the group consisting of silicone dioxide, white carbon, diatomaceous earth, calcium silicate, aluminum silicate, bentonite, zeolite, basic magnesium carbonate, natural gypsum, pumice and volcanic ash and having a particle size of from 0.005–10 $\mu$m, and 60–97% by weight of a thermoplastic resin.

8. A method according to claim 7 wherein the composition is in the form of pellets.

9. A method according to claim 6 wherein the composition is in the form of pellets.

10. A method according to claim 6 wherein (1) is a sodium salt of an alkylbenzene sulfonic acid.

* * * * *